US012482442B1

(12) United States Patent
Young

(10) Patent No.: US 12,482,442 B1
(45) Date of Patent: Nov. 25, 2025

(54) PLECTRUM HOLDER

(71) Applicant: Joshua Young, Portland, OR (US)

(72) Inventor: Joshua Young, Portland, OR (US)

(*) Notice: Subject to any disclaimer, the term of this patent is extended or adjusted under 35 U.S.C. 154(b) by 211 days.

(21) Appl. No.: 18/231,686

(22) Filed: Aug. 8, 2023

(51) Int. Cl.
*G10D 3/173* (2020.01)

(52) U.S. Cl.
CPC .................................... *G10D 3/173* (2020.02)

(58) Field of Classification Search
CPC ...................................................... G10D 3/173
See application file for complete search history.

(56) References Cited

U.S. PATENT DOCUMENTS

| | | | | |
|---|---|---|---|---|
| 4,020,732 A | 5/1977 | Kelly | | |
| 4,102,234 A | 7/1978 | Brundage | | |
| 4,122,746 A | 10/1978 | Freeman | | |
| 4,137,814 A | 2/1979 | Rowley | | |
| 4,497,237 A | 2/1985 | Beall | | |
| 5,837,913 A | 11/1998 | Newman | | |
| 6,127,613 A | 10/2000 | Hansel | | |
| 6,242,677 B1 * | 6/2001 | Sander | G10D 3/173 84/322 | |
| 6,949,700 B1 | 9/2005 | Kelly | | |
| 7,312,386 B2 | 12/2007 | Sielaff et al. | | |
| 7,589,267 B1 | 9/2009 | Sims | | |
| 7,799,979 B2 | 9/2010 | Swartz | | |
| 7,977,557 B2 | 7/2011 | Broderick | | |
| 8,492,630 B1 * | 7/2013 | Wonnacott | G10D 3/173 84/320 | |
| 9,153,213 B2 | 10/2015 | Storey | | |
| 9,202,446 B2 | 12/2015 | Gauthier | | |
| 9,361,864 B2 | 6/2016 | Parker | | |
| 9,754,564 B2 | 9/2017 | Knapp | | |
| 10,074,349 B2 | 9/2018 | Spivey et al. | | |
| 10,192,531 B1 | 1/2019 | Cobb | | |
| 10,235,977 B1 * | 3/2019 | Davis | G10D 3/173 | |
| 10,706,826 B1 * | 7/2020 | Sweeney | F16M 13/04 | |
| 10,950,209 B1 | 3/2021 | Greene | | |
| 2002/0108483 A1 | 8/2002 | Smith | | |
| 2003/0047058 A1 | 3/2003 | Pearson-Bey | | |
| 2005/0092158 A1 | 5/2005 | Santa Cruz et al. | | |
| 2005/0217456 A1 | 10/2005 | Hodesh et al. | | |
| 2006/0117931 A1 | 6/2006 | Benyahia et al. | | |
| 2009/0056521 A1 | 3/2009 | Goad | | |
| 2009/0139384 A1 | 6/2009 | Bramucci | | |
| 2010/0180747 A1 | 7/2010 | Swartz | | |
| 2011/0079131 A1 | 4/2011 | Broderick | | |
| 2014/0076120 A1 | 3/2014 | Hollin, Jr. | | |
| 2015/0122105 A1 | 5/2015 | Storey | | |
| 2015/0143973 A1 | 5/2015 | Caccia | | |

(Continued)

FOREIGN PATENT DOCUMENTS

| | | | |
|---|---|---|---|
| CN | 102930855 B * | 9/2014 | |
| CN | 111785235 A * | 10/2020 | G10D 3/173 |

*Primary Examiner* — Georgia Y Epps
*Assistant Examiner* — Robert W Horn
(74) *Attorney, Agent, or Firm* — WOMBLE BOND DICKINSON (US) LLP

(57) ABSTRACT

A plectrum holder is disclosed. The plectrum holder includes a plectrum loop and a finger loop. The plectrum loop has a plectrum loop channel extending along a plectrum loop axis. The finger loop has a finger loop channel extending along a finger loop axis. The finger loop axis extends at a predetermined angle to the plectrum loop axis. Other embodiments are also described and claimed.

18 Claims, 4 Drawing Sheets

(56) References Cited

U.S. PATENT DOCUMENTS

| | | | |
|---|---|---|---|
| 2015/0223575 | A1 | 8/2015 | Farnum |
| 2015/0243264 | A1 | 8/2015 | Parker |
| 2015/0255050 | A1 | 9/2015 | Diaz Lopez |
| 2015/0294653 | A1 | 10/2015 | Harrington |
| 2016/0217773 | A1 | 7/2016 | Moffat |
| 2017/0221459 | A1 | 8/2017 | Caccia |
| 2021/0082376 | A1 | 3/2021 | Dunwoodie |
| 2021/0161695 | A1 | 6/2021 | Manley |

* cited by examiner

PLECTRUM HOLDER

FIELD

The present disclosure relates to musical instrument accessories. More particularly, the present disclosure relates to musical instrument accessories used to hold a plectrum to strum a musical instrument.

BACKGROUND INFORMATION

Musicians use plectrums, also known as picks, to pick or strum strings of a musical instrument. A plectrum is typically held between the fingers of the musician during strumming. The musician can control the plectrum to accurately play a musical piece.

SUMMARY

An ability of a musician to control a plectrum can be influenced by factors such as a material finish of the plectrum, e.g., how easily the plectrum can be gripped. A plectrum may be smooth and the fingers of a musician may become sweaty during play, leading to slipping, moving, or shifting of the plectrum. Such disturbances can lead to strings of a musical instrument being incorrectly strummed by the musician, which can negatively affect a musical performance. Accordingly, there is a need for a musical instrument accessory to hold and stabilize a plectrum relative to the fingers of the musician.

The present invention provides a plectrum holder that can stabilize a plectrum relative to fingers of a musician during strumming. In an embodiment, a plectrum holder includes a plectrum loop and a finger loop. The plectrum loop has a plectrum loop channel extending along a plectrum loop axis. The finger loop has a finger loop channel extending along a finger loop axis. The finger loop axis extends at a predetermined angle to the plectrum loop axis.

A method of manufacturing the plectrum holder is also provided. The method includes forming the plectrum loop and forming the finger loop.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

Certain embodiments of the invention will be described with reference to the accompanying drawings. However, the accompanying drawings illustrate only certain aspects or implementations of the invention by way of example and are not meant to limit the scope of the claims.

Embodiments describe a plectrum holder. The plectrum holder can be used to hold a plectrum for strumming a musical instrument, such as a guitar. The plectrum holder may hold plectrums used for other musical instruments, however, and reference to a particular musical instrument or musical setting is made by way of example and not limitation.

In various embodiments, description is made with reference to the figures. However, certain embodiments may be practiced without one or more of these specific details, or in combination with other known methods and configurations. In the following description, numerous specific details are set forth, such as specific configurations, dimensions, and processes, in order to provide a thorough understanding of the embodiments. In other instances, well-known processes and manufacturing techniques have not been described in particular detail in order to not unnecessarily obscure the description. Reference throughout this specification to "one embodiment," "an embodiment," or the like, means that a particular feature, structure, configuration, or characteristic described is included in at least one embodiment. Thus, the appearance of the phrase "one embodiment," "an embodiment," or the like, in various places throughout this specification are not necessarily referring to the same embodiment. Furthermore, the particular features, structures, configurations, or characteristics may be combined in any suitable manner in one or more embodiments.

The use of relative terms throughout the description may denote a relative position or direction. For example, "distal" may indicate a first direction relative to a reference point. Similarly, "proximal" may indicate a second direction opposite to the first direction. Such terms are provided to establish relative frames of reference, however, and are not intended to limit the use or orientation of a plectrum holder to a specific configuration described in the various embodiments below.

In an aspect, a plectrum holder is provided that includes a plectrum loop and a finger loop. Each loop has a respective channel extending along the respective axis. The axes can be oriented at a predetermined angle to each other. Furthermore, the finger loop may be coupled to a wall of the plectrum loop in a stable manner. More particularly, the loops may be monolithically formed such that a plectrum held by the plectrum loop remains secured in place relative to a finger inserted through the finger loop. Accordingly, there is a reduced likelihood that the plectrum will move or shift relative to the fingers of the musician when strumming a musical instrument.

Figure 1:
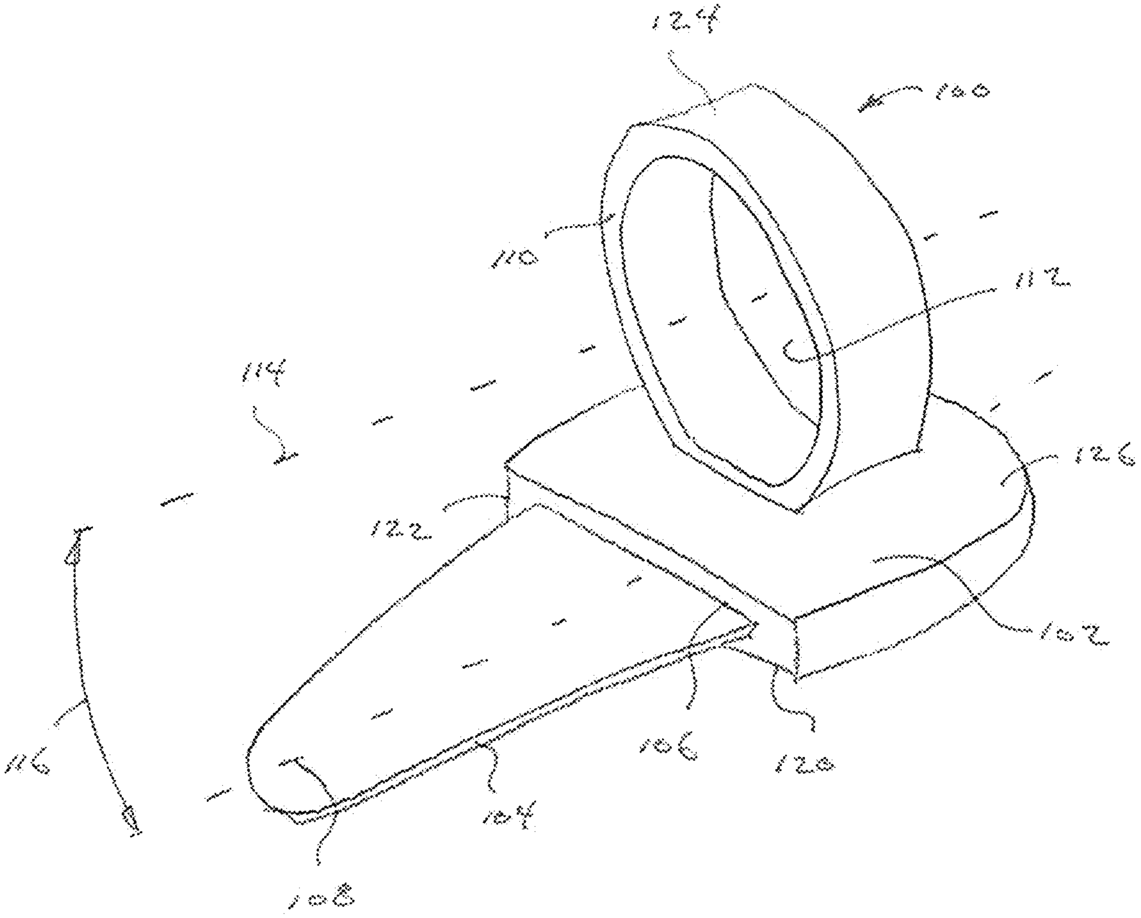
FIG. 1 is a perspective view of a plectrum holder, in accordance with an embodiment.

Referring to FIG. 1, a perspective view of a plectrum holder is shown in accordance with an embodiment. A plectrum holder 100 can hold and stabilize a plectrum 104 to reduce a likelihood that the plectrum 104 will shift or move during use. More particularly, the plectrum holder 100 can secure the plectrum 104 relative to a finger of a musician.

In an embodiment, the plectrum holder 100 includes a plectrum loop 102 to receive and hold a plectrum 104. The plectrum loop 102 can have a plectrum loop channel 106 that the plectrum 104 is inserted into. For example, the plectrum loop channel 106 can extend along a plectrum loop axis 108, e.g., in a longitudinal direction, and a proximal end of the plectrum 104 can fit into the plectrum loop channel 106 along the plectrum loop axis 108 to engage the plectrum loop 102.

The plectrum holder 100 can include a finger loop 110 to receive or fit onto a finger of a user. More particularly, the finger loop 110 can have a finger loop channel 112 within which the finger of the user can fit to engage the finger loop 110. The finger loop channel 112 can extend along a finger loop axis 114. The finger loop axis 114 can extend in the longitudinal direction. More particularly, both the finger loop axis 114 and the plectrum loop axis 108 can extend in a distal direction through respective channels.

The finger loop axis 114 and the plectrum loop axis 108 may be oriented at a predetermined angle 116 relative to each other. More particularly, the finger loop axis 114 may extend at the predetermined angle 116 to the plectrum loop axis 108. The predetermined angle 116 between the plectrum loop axis 108 and the finger loop axis 114 can depend on which finger of the musician the plectrum holder 100 is intended to receive. For example, the plectrum holder 100 may be intended to receive an index or a middle finger of the user within the finger loop channel 112. In such case, the plectrum loop axis 108 can be substantially parallel to the finger loop axis 114. For example, the angle 116 between the plectrum loop axis 108 and the finger loop axis 114 can be in a range of 0 to 30 degrees, e.g., 5 degrees. Accordingly, the user can comfortably pinch and control the plectrum holder 100 by inserting the index finger through the finger loop 110 and placing a thumb against a bottom surface 120 of the plectrum loop 102.

In an embodiment, the plectrum holder 100 is intended to receive the thumb of the user. In such case, the plectrum loop axis 108 can be substantially orthogonal to the finger loop axis 114. For example, the angle 116 between the plectrum loop axis 108 and the finger loop axis 114 can be in a range of 60 to 90 degrees, e.g., 85 degrees. Accordingly, the user can comfortably pinch and control the plectrum holder 100 by inserting the thumb through the finger loop 110 and placing an index finger against a side surface 122 of the plectrum loop 102.

The axes 108, 114 may be defined by surrounding surfaces. For example, an interior surface of the finger loop 110, which receives and presses against a finger of a musician during use, may be symmetrically disposed around the finger loop axis 114. Similarly, an interior surface of the plectrum loop 102, which receives and presses against a plectrum during use, may be symmetrically disposed around the plectrum axis 108. The axes may therefore be considered central axes of their respective channels. Furthermore, with the axes may extend with a same plane. For example, as shown in FIG. 1, the plectrum loop axis 108 and the finger loop axis 114 may both extend longitudinally within a vertical plane that bisects the plectrum holder into symmetric halves. The angle 116 may therefore be defined within the common plane in such case.

Maintaining a relative position between the finger loop 110 and the plectrum loop 102, or between the finger loop axis 114 and the plectrum loop axis 108, can ensure that the plectrum 104 remains stable relative to the finger of the user while strumming. Accordingly, the finger loop 110 may be rigidly secured to the plectrum loop 102. For example, the finger loop 110 can have a loop wall that is coupled to the plectrum loop 102. The loop wall 124 can be secured to a top surface 126 of the plectrum loop 102. The rigid attachment of the finger loop 110 to the plectrum loop 102 may result from monolithically forming the plectrum holder 100, as described below. More particularly, the plectrum holder 100 can be monolithically formed such that the plectrum loop 102 and the finger loop 110 are integral portions of the plectrum holder 100, and the integral portions may not move at a location where they attach to each other.

Figure 2:
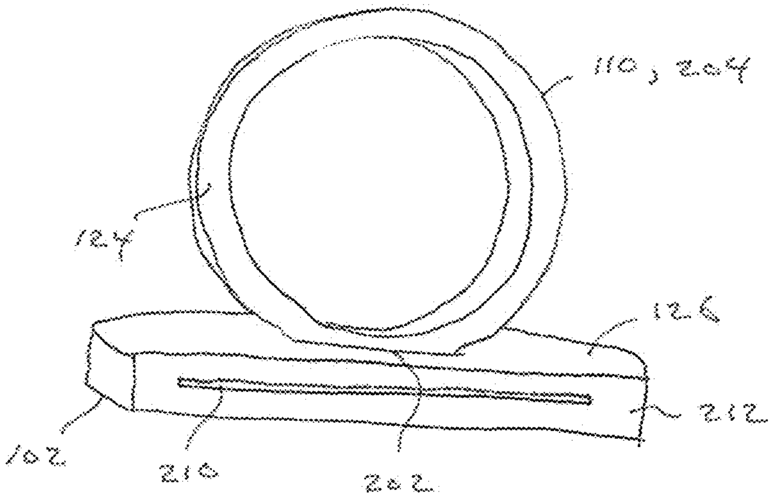
FIG. 2 is a front perspective view of a plectrum holder, in accordance with an embodiment.

Referring to FIG. 2, a front perspective view of a plectrum holder is shown in accordance with an embodiment. The finger loop 110 can be attached to the plectrum loop 102 at a transitional edge 202. The transitional edge 202 can be a corner between the loop wall 124 and the top surface 126 of the plectrum loop 102. The rigid attachment at the transition can secure the finger loop 110 to the plectrum loop 102, and maintain the relative angle 116 between the finger loop axis 114 and the plectrum loop axis 108.

It will be appreciated that, although the finger loop 110 may be spatially constrained relative to the plectrum loop 102, the portions of the plectrum holder 100 may deflect relative to each other during use. For example, the plectrum holder 100 may be monolithically formed from elastic material, such as silicone or neoprene, which has flexibility and resilience. The flexibility and resilience of the plectrum holder 100 can allow the finger loop 110 to adjust to differently sized fingers. Similarly, the plectrum loop 102 can adjust to different size plectrums 104. Furthermore, when gripped between the fingers of the user, the plectrum holder 100 can conform to the grip and can bend slightly for comfort while maintaining a range of the predetermined angle 116 within a tolerance of about 0 to 30 degrees. For example, the grip of the user can cause the finger loop 110 to flex slightly, allowing the angle 116 to open or close by less than 30 degrees. When the grip load is removed, e.g., when the plectrum holder 100 is taken off of the finger, the holder material can resiliently return to an original state in which the finger loop axis 114 and the plectrum loop axis 108 are set at the predetermined angle 116 relative to each other.

In an embodiment, the finger loop 110 is a circular ring 204. More particularly, the finger loop 110 can have an annular wall including an inner diameter and/or an outer diameter. The circular ring 204 can slip easily onto any finger, e.g., an index finger or a thumb of a user. To the extent that the receiving finger is not circular, the circular loop may be flexible to deform and conform to an outer surface of the finger. Accordingly, the ring can be slipped onto any finger that the user wishes to control the plectrum 104.

Advantageously, the circular ring 204 having an ability to flex and conform to a finger provides for a compact design. More particularly, the circular ring 204 can be formed from a thin loop, that is not bulky and can easily fit within a pocket. Furthermore, the ring shape can be strong and resist breaking because the circular loop provides a resilient structure.

The plectrum loop 102 can connect to the finger loop 110 to provide a holder for accepting and stabilizing plectrums 104 of different sizes. In an embodiment, the plectrum 104 is received in a slot formed through the plectrum loop 102. For example, the plectrum loop channel 106 can include a planar slot 210 that extends along the plectrum loop axis 108. More particularly, the planar slot 210 can extend along the plectrum loop axis 108 from a front surface 212 of the plectrum loop 102.

Figure 3:
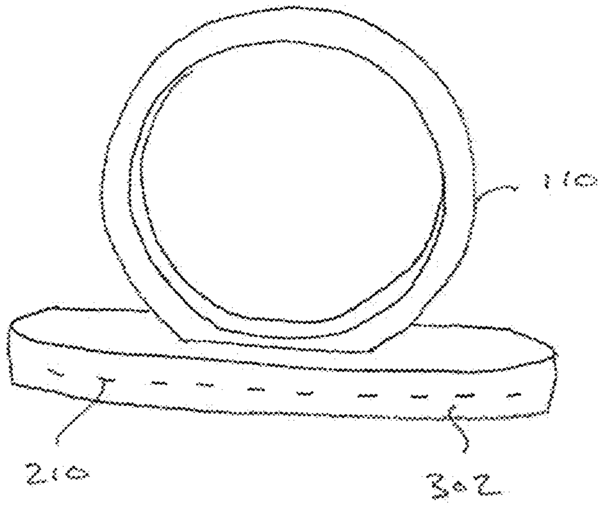
FIG. 3 is a rear perspective view of a plectrum holder, in accordance with an embodiment.
Figure 4:
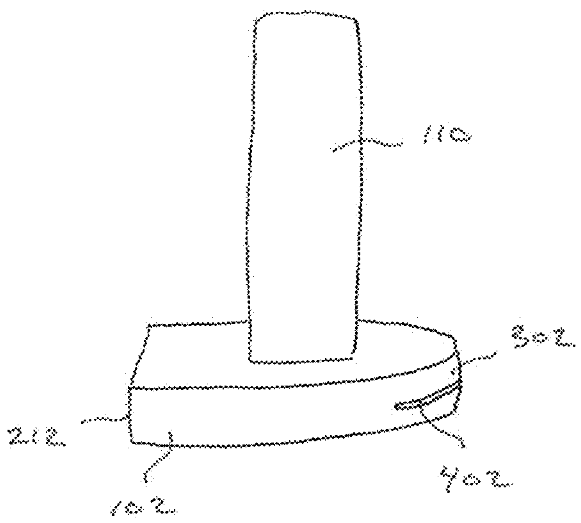
FIG. 4 is a side perspective view of a plectrum holder, in accordance with an embodiment.

FIG. 3, a rear view of a plectrum holder is shown in accordance with an embodiment. The planar loop channel may be an open channel. More particularly, the planar slot 210 may extend along the plectrum loop axis 108 from the front surface 212 of the plectrum loop 102 entirely through a depth of the plectrum loop 102 to a back surface 302. In such case, the dotted line of FIG. 3 can represent a slot opening coincident with the back surface 302 (FIG. 4). The slot through the entire depth can form an open channel having a front opening, at the front surface 212, and a back opening, at the back surface 302.

Figure 5:
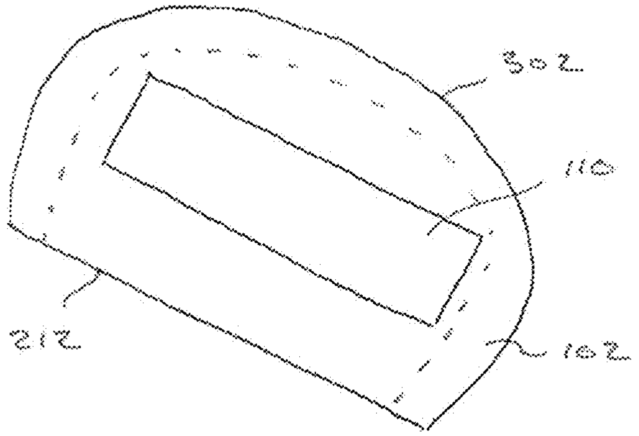
FIG. 5 is a top view of a plectrum holder, in accordance with an embodiment.

The plectrum loop channel 106 can be a closed channel. More particularly, the planar slot 210 may extend along the plectrum loop axis 108 from the front surface 212 of the plectrum loop 102 partially through the depth of the plectrum loop 102. The slot can terminate prior to reaching the back surface 302. In such case, the dotted line of FIG. 3 can represent a bottom of the slot, hidden within the body of the finger loop 110 distal to the back surface 302 (FIG. 5). The slot through a portion of the depth can form the closed channel having a front opening, at the front surface 212, and the bottom distal to the back surface 302.

Referring to FIG. 4, a side view of a plectrum holder is shown in accordance with an embodiment. In a side view, the slot opening 402 coincident with the back surface 302 is apparent. The slot opening 402 can be an exit of the planar slot 210 passing longitudinally through the body of the plectrum loop 102. Accordingly, the plectrum 104 can be inserted into the planar slot 210 through the front surface 212 of the plectrum loop 102, and can exit through the slot opening 402 in the back surface 302 of the plectrum loop 102.

Referring to FIG. 5, a top view of a plectrum holder is shown in accordance with an embodiment. The planar slot 210 having a closed back, e.g., the closed channel, is represented by dotted lines within the top profile of the plectrum holder 100. In the top view, the planar slot 210 is apparent within the space bound by the dotted lines in the front surface 212 of the plectrum loop 102. The planar slot 210 can conform to an outer edge of the plectrum 104. For example, the plectrum 104 can have a wide curved back edge, and the dotted lines representing a back face or bottom of the planar slot 210 can have the same shape. Accordingly, the plectrum 104 can be inserted into the planar slot 210, and the back edge of the plectrum 104 can appose the back face of the planar slot 210.

Whether the plectrum holder 100 includes an open channel or a closed channel to receive the plectrum 104, the plectrum loop 102 may be adapted to receive plectrums of different sizes. For example, the plectrum loop 102 can be formed from an elastomeric material that allows the loop to stretch and conform to an outer surface of the plectrum 104. Furthermore, the planar slot 210 allows for substantial surface-to-surface contact between the interior surface surrounding the planar slot 210 and the plectrum 104 when the plectrum 104 is located within the planar slot 210. The surface-to-surface contact can provide a friction fit between the plectrum 104 and the plectrum loop 102, even when the plectrum shape is slightly smaller than a shape of the planar slot 210. The plectrum holder 100 can therefore achieve a tight grip of the plectrum 104, and the finger loop 110 can be secured to the hand of the user for stable play.

Figure 6:
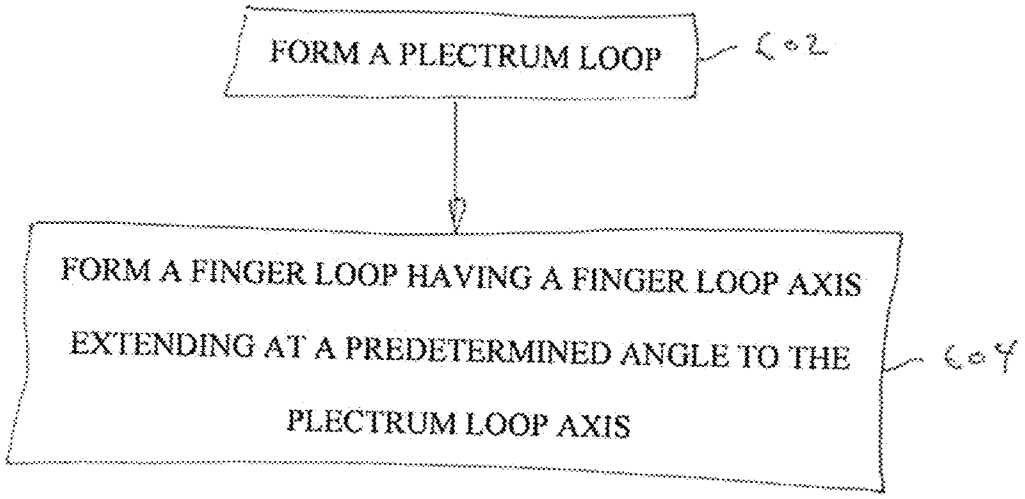
FIG. 6 is a flowchart of a method of manufacturing a plectrum holder, in accordance with an embodiment.

Referring to FIG. 6, a flowchart of a method of manufacturing a plectrum holder is shown in accordance with an embodiment. At operation 602, the plectrum loop 102 is formed. The plectrum loop 102 may be formed in an injection molding process. Similarly, the plectrum loop 102 may be cast. Other manufacturing technologies, such as machining technologies, can also be used to form the plectrum loop 102.

In an embodiment, forming the plectrum loop 102 includes slitting a plectrum loop body. More particularly, the plectrum loop body may be molded as a solid piece. A longitudinal slit may be introduced through the solid piece along the planar loop axis 108 to form the planar slot 210. Accordingly, the plectrum loop 102 may be formed over several operations.

At operation 604, the finger loop 110 is formed. Like the plectrum loop 102, the finger loop 110 may be formed using molding, casting, or machining technologies. Furthermore, the finger loop 110 may be formed in several operations. For example, the hole in the finger loop 110 used to receive the finger of the user may be introduced into a solid piece along the finger loop axis 114 by a drilling operation.

The method of manufacturing the plectrum holder 100 can include formation of the plectrum loop 102 and the finger loop 110 in the a same operation or in different operations. The plectrum loop 102 and the finger loop 110 can be formed in a same molding operation. The plectrum holder 100 can therefore be formed monolithically in that an entire body of the holder can be formed in a single, solid structure. Monolithic formation of the plectrum holder 100 can cause the loops to be integral portions of the holder that are rigidly attached to each other. Although rigidly and securely attached, e.g., along the transitional edge 202, flexibility of the individual loops can nonetheless allow them to elastically deform around a plectrum or a finger, and to elastically deflect relative to each other. The monolithically formed structure can therefore provide a stable yet flexible and resilient holder to secure the plectrum to the finger.

In an alternative embodiment, the loops may be formed in separate molding operations. For example, the plectrum loop 102 may be formed in a first molding operation, and the finger loop 110 may be overmolded on to the plectrum loop 102. In such case, the loops may have a same or different material. For example, the plectrum loop 102 may be formed from a more rigid material than the finger loop 110. Accordingly, the plectrum loop 102 may be more robust to grip the plectrum 104, and the finger loop 110 may be more flexible to expand around differently sized fingers of different musicians. The portions, although formed in different molding operations, may nonetheless be considered monolithic in that they are rigidly attached to each other at a point of connection, e.g., along the transitional edge 202, and therefore form portions of a single solid body. The benefits of a monolithic structure described above, including secure gripping of a plectrum and constraining the plectrum relative to a finger, inure to the benefit of the musician.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A plectrum holder, comprising:

a plectrum loop having a plectrum loop wall extending around a plectrum loop channel extending along a plectrum loop axis; and a finger loop having a finger loop wall extending around a finger loop channel extending along a finger loop axis, wherein the finger loop wall is rigidly attached to the plectrum loop wall along a transitional edge such that the finger loop axis extends at an angle to the plectrum loop axis and the finger loop is deformable relative to the plectrum loop at the transitional edge to cause the angle to deflect within a constraint range.

2. The plectrum holder of claim 1, wherein the plectrum loop axis is substantially parallel to the finger loop axis.

3. The plectrum holder of claim 1, wherein the plectrum loop axis is substantially orthogonal to the finger loop axis.

4. The plectrum holder of claim 1, wherein the plectrum loop channel includes a planar slot extending along the plectrum loop axis.

5. The plectrum holder of claim 1, wherein the finger loop is a circular ring.

6. The plectrum holder of claim 1, wherein the plectrum loop channel is an open channel.

7. The plectrum holder of claim 1, wherein the plectrum loop channel is a closed channel.

8. The plectrum holder of claim 1, wherein the plectrum holder is monolithically formed such that the plectrum loop and the finger loop are integral portions of the plectrum holder.

9. The plectrum holder of claim 8, wherein the plectrum holder is monolithically formed from an elastomeric material.

10. The plectrum holder of claim 9, wherein the plectrum holder is monolithically formed from silicone.

11. The plectrum holder of claim 9, wherein the plectrum holder is monolithically formed from neoprene.

12. A method, comprising:

forming a plectrum loop having a plectrum loop wall extending around a plectrum loop channel extending along a plectrum loop axis; and forming a finger loop having a finger loop wall extending around a finger loop channel extending along a finger loop axis, wherein the finger loop wall is rigidly attached to the plectrum loop wall along a transitional edge such that the finger loop axis extends at an angle to the plectrum loop axis and the finger loop is deformable relative to the plectrum loop at the transitional edge to cause the angle to deflect within a constraint range.

13. The method of claim 12, wherein the plectrum loop axis is substantially parallel to the finger loop axis.

14. The method of claim 12, wherein the plectrum loop axis is substantially orthogonal to the finger loop axis.

15. The method of claim 12, wherein the plectrum loop channel includes a planar slot extending along the plectrum loop axis.

16. The method of claim 12, wherein the finger loop is a circular ring.

17. The method of claim 12, wherein the plectrum loop and the finger loop are monolithically formed as integral portions of a plectrum holder.

18. The method of claim 17, wherein the plectrum holder is monolithically formed from an elastomeric material.

* * * * *